United States Patent
Yamazaki et al.

(10) Patent No.: US 7,029,029 B2
(45) Date of Patent: Apr. 18, 2006

(54) AIRBAG APPARATUS

(75) Inventors: Takeshi Yamazaki, Saitama (JP); Hideki Akiyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 138 days.

(21) Appl. No.: 10/395,397

(22) Filed: Mar. 25, 2003

(65) Prior Publication Data

US 2003/0218317 A1 Nov. 27, 2003

(30) Foreign Application Priority Data

Mar. 27, 2002 (JP) .............................. 2002-089415

(51) Int. Cl.
*B60R 21/22* (2006.01)
*B62J 27/00* (2006.01)

(52) U.S. Cl. .................................. 280/730.1; 180/219
(58) Field of Classification Search ............. 280/730.1, 280/731
See application file for complete search history.

(56) References Cited

U.S. PATENT DOCUMENTS

| | | | | |
|---|---|---|---|---|
| 4,167,276 A | * | 9/1979 | Bell et al. .................. | 280/731 |
| 5,458,371 A | * | 10/1995 | Fulmer et al. ............. | 280/741 |
| 5,700,029 A | * | 12/1997 | Enders ..................... | 280/728.2 |
| 5,938,231 A | * | 8/1999 | Yamazaki ................. | 280/730.1 |
| 5,967,545 A | * | 10/1999 | Iijima et al. .............. | 280/730.1 |
| 6,007,090 A | * | 12/1999 | Hosono et al. ........... | 280/730.2 |
| 6,714,847 B1 | * | 3/2004 | Ota .......................... | 701/46 |
| 6,793,033 B1 | * | 9/2004 | Yamazaki et al. ........ | 180/268 |
| 2003/0132616 A1 | * | 7/2003 | Yanagibashi et al. .... | 280/730.1 |
| 2004/0007855 A1 | * | 1/2004 | Kurata et al. ............. | 280/729 |
| 2004/0150197 A1 | * | 8/2004 | Iijima et al. .............. | 280/730.1 |
| 2004/0207182 A1 | * | 10/2004 | Miyata .................... | 280/730.1 |
| 2004/0207185 A1 | * | 10/2004 | Miyata .................... | 280/730.1 |

FOREIGN PATENT DOCUMENTS

| | | | |
|---|---|---|---|
| DE | 101 06 437 A1 | | 8/2002 |
| JP | 2002137777 A | * | 5/2000 |
| JP | 2001-219884 A | | 8/2001 |
| JP | 2002137779 A | * | 5/2002 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

An airbag apparatus for a motorcycle having a steering handle mounted so as to be capable of rotating with respect to a head pipe mounted at the front end of a main frame is capable of being mounted after assembly, e.g., as an after-market add-on or retrofit to an existing vehicle, or during vehicle assembly or manufacture. An airbag mounting member is mounted so as to extend from the main frame toward the front of the vehicle body across a central axis of rotation of the steering handle and a top bridge of the main frame. An airbag module is mounted on the airbag mounting member so that the upper portion of the airbag module is covered by a covering member.

19 Claims, 3 Drawing Sheets

AIRBAG APPARATUS

CROSS-REFERENCES TO RELATED APPLICATIONS

This nonprovisional application claims priority under 35 U.S.C. §119(a) on Patent Application No. 2002-089415 filed in Japan on Mar. 27, 2002, the entirety of which is herein incorporated by reference.

BACKGROUND OF THE INVENTION

1. Field of the Invention

The present invention relates to an airbag apparatus, and more specifically, to an airbag apparatus suitable for mounting on a saddle-riding type vehicle in which a storage space for an airbag body is not typically easily secured.

2. Description of the Background Art

Airbags are well known and in widespread use in four-wheeled vehicles, particularly for mounting on a four-wheeled vehicle for alleviating an impact applied to an occupant during a collision of the vehicle. In recent years, it is proposed to mount the airbag apparatus not only on four-wheeled vehicles, but also on saddle-riding type vehicles such as motorcycles.

For example, in the motorcycle described in JP-A-2000-219884, the airbag is supported by a vehicle body and is capable of moving with respect to a center of rotation of a handle at a position between the handle and a wind-shielding member covering the region forward of the handle. In this motorcycle, the airbag is inflated laterally with respect to the vehicle body along the handle.

The present inventors have determined that the following problems exist in the aforementioned airbag apparatus of the background art. The airbag apparatus is typically disposed on the front side of the handle of the motorcycle. However, depending on the shape of the vehicle, a sufficient space cannot be secured in front of the handle. When providing the airbag apparatus between the handle and a wind-shielding member, a space for storing the airbag must be secured in advance, since it is difficult to mount the airbag after assembly.

SUMMARY OF THE INVENTION

The present invention overcomes the shortcomings associated with the background art and achieves other advantages not realized by the background art.

An object of the present invention is to provide an airbag apparatus that does not interfere with the operation of the handle of a saddle-riding type vehicle.

An object of the present invention is to provide an airbag apparatus that can be mounted easily on a saddle-riding type vehicle after assembly.

One or more of these and other objects are accomplished by an airbag apparatus for a saddle-ridden vehicle, the airbag apparatus comprising auxiliary support members for supporting the airbag apparatus on a frame of the saddle-ridden vehicle; a mounting plate being laid between the auxiliary support members; an airbag cover; and an airbag module being supported on the mounting plate, the airbag module having an upper surface being covered by the airbag cover.

One or more of these and other objects are further accomplished by a saddle-ridden vehicle having an airbag apparatus, wherein the saddle-ridden vehicle includes a vehicle body having a main frame, a head pipe at a front end of the main frame, and a steering handle mounted so as to be capable of a rotating motion with respect to the head pipe, the airbag apparatus comprising an airbag mounting plate extending from the main frame forward of the vehicle body and across the central axis of rotation of the steering handle; an airbag cover; and an airbag module mounted on the mounting plate above the central axis of rotation of the steering handle, the airbag module having an upper surface being covered by the airbag cover.

One or more of these and other objects are further accomplished by a method of providing an airbag apparatus for a saddle-ridden vehicle having a vehicle body having a main frame, and a steering handle, wherein the airbag apparatus includes an airbag mounting plate, an airbag cover and an airbag module, the method comprising mounting the airbag mounting plate in a position extending from the main frame forward of the vehicle body and across a central axis of rotation of the steering handle; and mounting the airbag module on the mounting plate above the central axis of rotation of the steering handle, the airbag module having an upper surface being covered by the airbag cover, the airbag apparatus being mounted in a space formed above the central axis of rotation of the steering handle of the saddle-ridden vehicle.

According to the present invention, the airbag apparatus is installed utilizing a space above the central axis of rotation of the steering handle. This space is located at a position nearest to the rider, e.g., in front of the rider. Therefore, the deployed airbag contacts the rider before knocking against any other members upon a collision or other triggering event. The airbag apparatus provided in this space is convenient for mounting on the saddle-riding type vehicle such as a motorcycle or All-Terrain Vehicle, including after assembly as an optional member.

The airbag apparatus is provided at a position convenient for mounting after assembly and fixed on the mainframe of the vehicle body. Further, the airbag is not affected by the movement of the steering handle upon collision, and the deployed airbag can contact the rider from the front.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
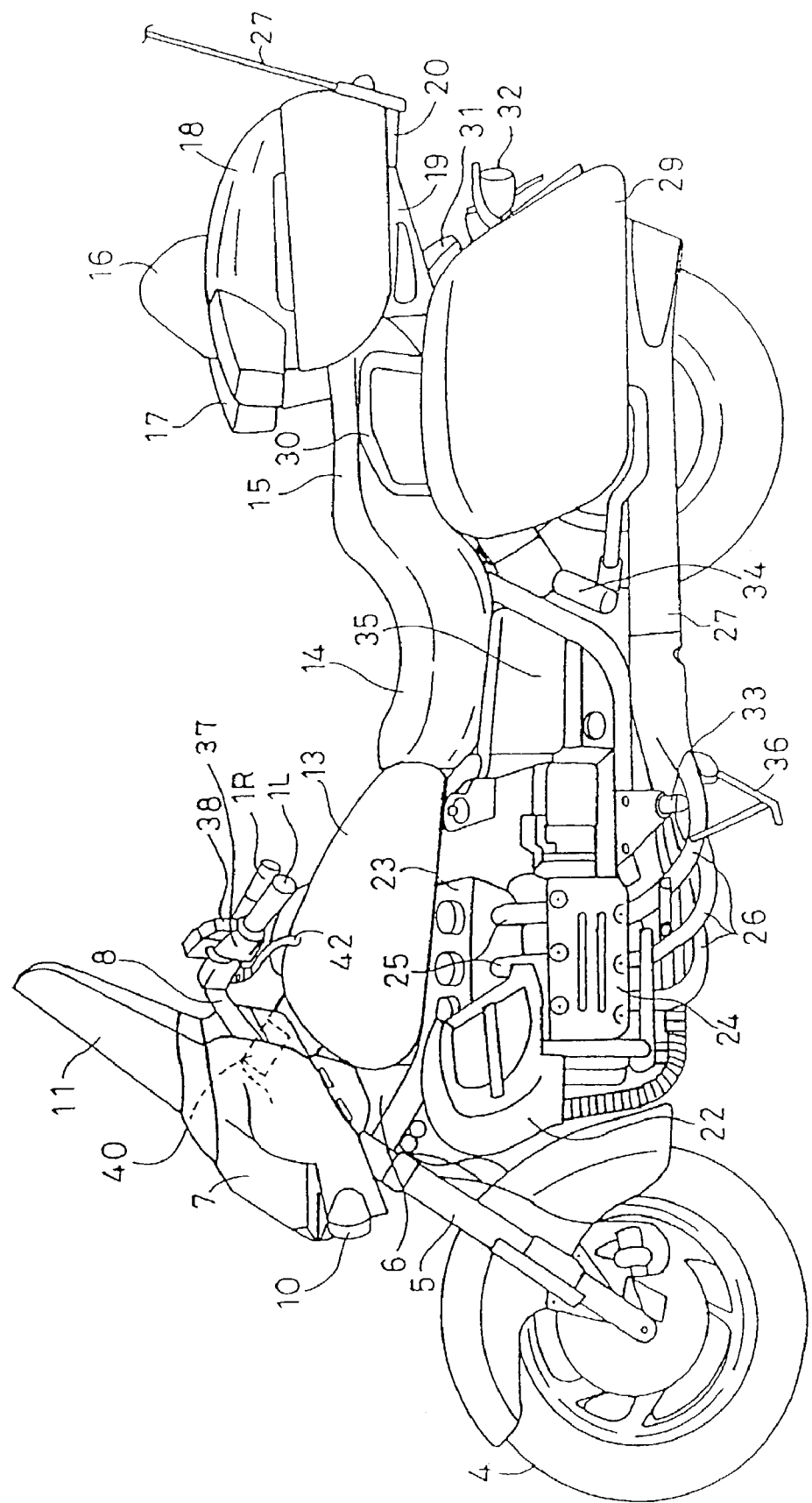
FIG. 1 is a side view of a motorcycle having an airbag apparatus according to an embodiment of the present invention.
Figure 2:
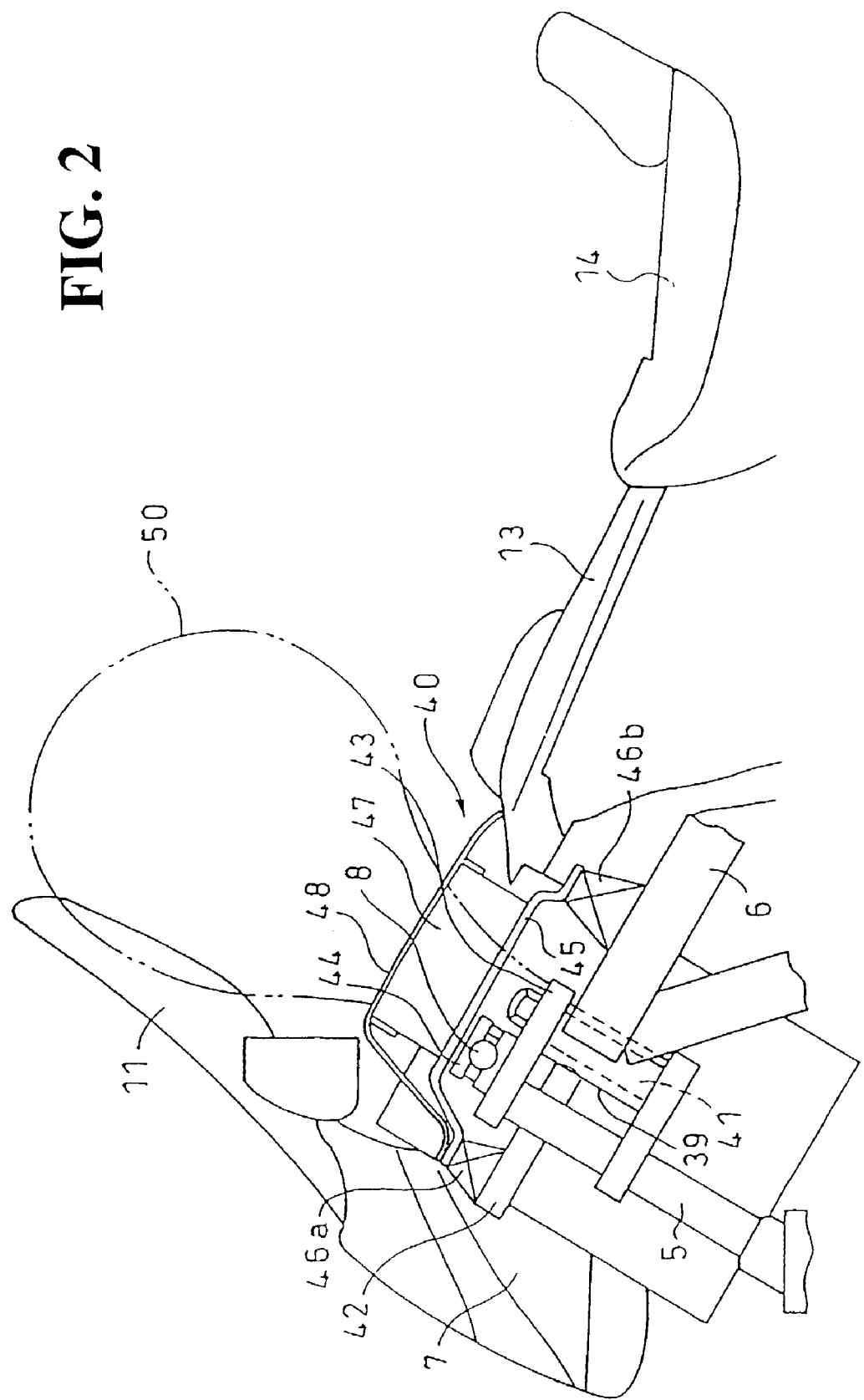
FIG. 2 is an enlarged side view showing a front portion of a motorcycle on which an airbag apparatus is mounted according to an embodiment of the present invention.
Figure 3:
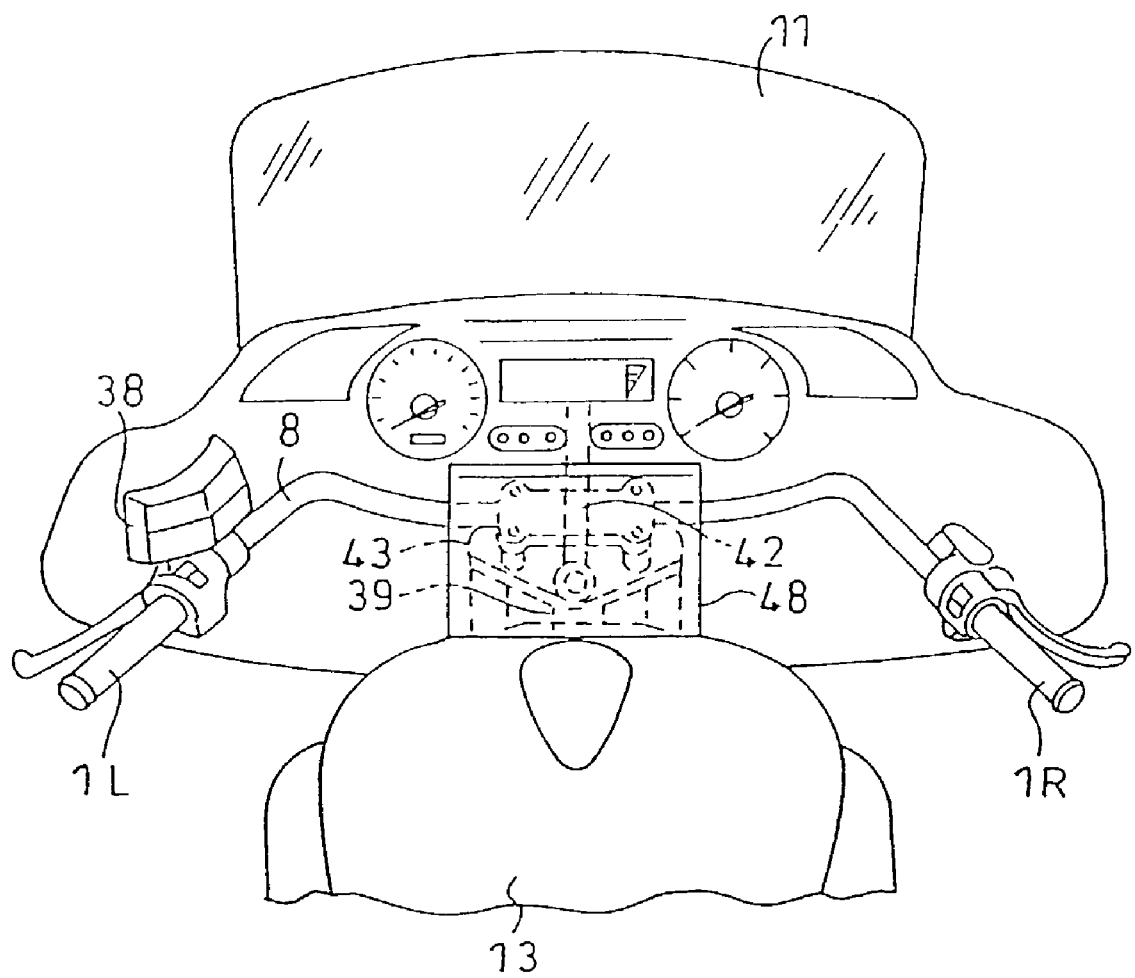
FIG. 3 is a perspective view of a portion of the motorcycle in the vicinity of the steering handle on which the airbag apparatus is mounted in an embodiment of the present invention.

The present invention will hereinafter be described with reference to the accompanying drawings. FIG. 1 is a side view of a motorcycle having an airbag apparatus according to an embodiment of the present invention. FIG. 2 is an enlarged side view showing a front portion of a motorcycle on which an airbag apparatus is mounted according to an embodiment of the present invention. FIG. 3 is a perspective view of a portion of the motorcycle in the vicinity of the steering handle on which the airbag apparatus is mounted in an embodiment of the present invention.

Referring now to the drawings, the present invention will be described in detail. FIG. 1 is a side view of a motorcycle, e.g., an example of a saddle-riding type vehicle, on which the airbag apparatus of the present invention is to be mounted. A front fork 5 supporting a front wheel 4 is supported so as to be rotatable with respect to a main frame 6, and a handle 8 is attached on the upper portion thereof. An airbag apparatus 40 is installed above the portion around the center of rotation of the handle 8.

A front fairing (cowl) 7 is provided on the front face of the handle 8. A headlight, (not shown) is accommodated in the front fairing 7, and direction indicator lights 10 are attached on both sides. A wind-shielding screen 11 is mounted on the upper portion of the front fairing 7.

A fuel tank 13, a rider's seat 14, and a passenger's seat 15 are disposed in order from the front fairing 7 rearward of the vehicle body. The passenger's seat 15 is formed integrally with the rider's seat 14 and includes a seatback 16 and armrests 17. A rear box 18 is provided behind the seatback 16. A bracket 19 supporting the rear box 18 is provided with a supporting member 20 which projects in a horizontal direction, and the supporting member 20 is provided with an antenna 21.

An air cleaner 22 is provided in front of the lower portion of the fuel tank 13, and a carburetor 23 is rearward thereof. An air intake pipe 25 extends from a carburetor 23 toward an engine 24. The engine 24 is a horizontally opposed 6-cylinder engine. An exhaust pipe 26 is drawn rearward from the engine 24, and the exhaust pipe 26 is connected to a muffler 27. A radiator 74 is provided forwardly of the engine 24.

Side boxes 29 are disposed on the left and right of the rear wheel, and handrail pipes for the passenger are provided above. A tail lamp 31 and a rear direction indicator lamp 32 are attached on the rear portion of the vehicle body. Rider's steps 33 and passenger's steps 34 are provided on the left and right of the vehicle body. A side cover 35 and a main stand 36 are also provided on the motorcycle. Left and right handle grips 1L and 1R are provided at the ends of the handle 8, and a switch unit 37 is provided at a position adjacent to the handle grip 1L. An audio switch unit 38 is provided above and adjacent to the switch unit 37.

FIG. 2 is an enlarged side view showing the front portion of the motorcycle illustrating the position to mount the airbag apparatus, and FIG. 3 is a perspective view of the portion in the vicinity of the handle. As shown in FIG. 2 and FIG. 3, a head pipe 39 is connected to the front portion of the main frame 6. The upper portion of the front fork 5 is connected by a top bridge 43 and the top bridge 43 is rotatably connected to the head pipe 39 via a pivot 41. A holding attachment 44 for holding the handle 8 is secured on the top bridge 43.

A cowl stay 42 for supporting the front fairing 7 is connected to the main frame 6, and overhung forwardly from the vehicle body on the left side and right side thereof. The cowl stay 42, projecting from the head pipe 39 forward from the vehicle body, is an aggregate member for supporting the cowl or the front faring 7 in front thereof. The cowl stay 42 and the main frame 6 are provided with auxiliary members 46a, 46b (crossways on the sides thereof). A mounting plate 45 of the airbag apparatus 40 is laid between the auxiliary members 46a and 46b. An airbag module 47 is accommodated on the plate 45, and the upper surface of the airbag module 47 is covered by the airbag cover 48.

The airbag module 47 includes a folded airbag body, an inflator for deploying the airbag body, e.g., a canister for accommodating high-pressure gas, and a squib that explodes in response to detection of collision by a collision sensor (none of them are shown in the figure). A canister is opened by explosion of the squib and gas is fed to the airbag body to inflate and deploy the airbag body. The airbag cover 48 has a weakened portion broken by the pressure of the airbag body being inflated. The structure, material and so on to be used for the weakened portion of the airbag cover 48 may be selected from those that are publicly known, e.g., such as that shown and described in JP-A-5-105016 and JP-A-2001-206181, the entirety of each of which is hereby incorporated by reference. A simulated, inflated and deployed airbag 50 is shown in FIG. 2.

The impact sensor for detecting the impact of collision may be, for example, an acceleration sensor, which detects the abrupt change in speed (deceleration) upon collision and actuates the inflator.

The airbag apparatus is mounted effectively in the space above the central axis of rotation of the steering handle. Therefore, the airbag apparatus may be mounted easily after assembly in a saddle-riding type vehicle, such as a motorcycle, in which a mounting space cannot be secured in the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag apparatus for a saddle-ridden vehicle, said airbag apparatus comprising:
    a frame with a head pipe;
    a holding attachment rotatably supported by the head pipe;
    a pair of auxiliary support members fixed to the frame of said saddle-ridden vehicle so as not to rotate;
    wherein a first auxiliary support member of the pair of support members is fixed to the frame in a position forward of the holding attachment and a second auxiliary support member of the pair of support members is fixed to the frame in a position rearward with respect to the holding attachment;
    a mounting plate being laid between the auxiliary support members;
    an airbag cover; and
    an airbag module being supported on the mounting plate, said airbag module having an upper surface being covered by the airbag cover and being positioned above the holding attachment.

2. The airbag apparatus according to claim 1, wherein the airbag module further comprises:
    an air bag cover, said airbag module having an upper surface being covered by the airbag cover and being positioned above the holding attachment;

a folded airbag body;

an inflator for deploying the airbag body in an inflated position; and a collision sensor.

3. The airbag apparatus according to claim 2, wherein said inflator includes a canister accommodating a high-pressure gas.

4. The airbag apparatus according to claim 3, wherein said inflator includes a squib capable of exploding in response to detection of collision by the collision sensor.

5. The airbag apparatus according to claim 4, wherein the airbag cover has a weakened portion capable of being broken by a pressure of the airbag body prior to attaining the inflated position of the airbag body.

6. The airbag apparatus according to claim 5, wherein the collision sensor is an acceleration sensor capable of detecting an abrupt change in speed.

7. The airbag apparatus according to claim 2, wherein the airbag cover has a weakened portion capable of being broken by a pressure of the airbag body prior to attaining the inflated position of the airbag body.

8. The airbag apparatus according to claim 2, wherein the collision sensor is an acceleration sensor capable of detecting an abrupt change in speed.

9. A saddle-ridden vehicle having an airbag apparatus, wherein said saddle-ridden vehicle includes a vehicle body having a main frame, a head pipe at a front end of the main frame, and a steering handle mounted so as to be capable of a rotating motion with respect to the head pipe, said airbag apparatus comprising:

an airbag mounting plate extending from the main frame forward of the vehicle body and across the central axis of rotation of said steering handle;

an airbag cover; and an airbag module mounted on the mounting plate above the central axis of rotation of said steering handle, said airbag module having an upper surface being covered by the airbag cover and being in a fixed position relative to rotating motion of the steering handle.

10. The saddle-ridden vehicle according to claim 9, wherein said airbag cover includes a weakened portion for covering said airbag module and purposefully rupturing during a vehicle collision.

11. The saddle-ridden vehicle according to claim 10, further comprising:

a shaft member passing through said head pipe in the axial direction thereof;

a top bridge being connected to said shaft member; and a pair of front forks being connected to said top bridge, wherein said steering handle is fixed on said top bridge and said airbag mounting plate extends at least to a position covering an upper portion of said top bridge.

12. The saddle-ridden vehicle according to claim 11, wherein the airbag module further comprises:

a folded airbag body;

an inflator for deploying the airbag body in an inflated position; and a collision sensor.

13. The saddle-ridden vehicle according to claim 12, wherein said inflator includes a canister accommodating a high-pressure gas.

14. The saddle-ridden vehicle according to claim 13, wherein said inflator includes a squib capable of exploding in response to detection of collision by the collision sensor.

15. The saddle-ridden vehicle according to claim 14, wherein the collision sensor is an acceleration sensor capable of detecting an abrupt change in speed.

16. The saddle-ridden vehicle according to claim 14, wherein said saddle-ridden vehicle is a motorcycle.

17. A method of providing an airbag apparatus for a saddle-ridden vehicle having a vehicle body having a main frame, and a steering handle, wherein the airbag apparatus includes an airbag mounting plate, an airbag cover and an airbag module, said method comprising:

mounting said airbag mounting plate in a position extending from the main frame forward of the vehicle body and across a central axis of rotation of the steering handle; and mounting the airbag module on the mounting plate above the central axis of rotation of said steering handle, said airbag module having an upper surface being covered by the airbag cover, said airbag apparatus being mounted in a space formed above the central axis of rotation of the steering handle of the saddle-ridden vehicle.

18. The method according to claim 17, wherein said steps of mounting the airbag mounting plate and airbag module include retrofitting said airbag apparatus as an after-market feature for said saddle-ridden vehicle.

19. The method according to claim 18, wherein said saddle-ridden vehicle is a motorcycle or All-Terrain Vehicle.

* * * * *